(12) United States Patent
Wordin et al.

(10) Patent No.: US 6,484,999 B1
(45) Date of Patent: Nov. 26, 2002

(54) PLUG VALVE INTERNAL PRESSURE BALANCING

(76) Inventors: John J. Wordin, 735 N. 900 East, Shelley, ID (US) 83274; Eugene Chisely, 3626 Brentwood Dr., Fort Smith, AR (US) 72903

( * ) Notice: Subject to any disclaimer, the term of this patent is extended or adjusted under 35 U.S.C. 154(b) by 6 days.

(21) Appl. No.: 09/801,973

(22) Filed: Mar. 7, 2001

(51) Int. Cl.[7] .............................. F16K 5/16; F16K 39/06
(52) U.S. Cl. ...................................... 251/309; 251/283
(58) Field of Search ................................ 251/309, 283, 251/282, 181

(56) References Cited

U.S. PATENT DOCUMENTS

| | | | | |
|---|---|---|---|---|
| 2,239,795 A | * | 4/1941 | Parker | 251/283 |
| 3,194,534 A | * | 7/1965 | Sachnik | 251/283 X |
| 4,034,776 A | * | 7/1977 | Eshghy | 251/283 X |
| 4,519,414 A | * | 5/1985 | Anaya | 251/283 X |
| 4,614,330 A | * | 9/1986 | Kalsi et al. | 251/283 |
| 4,878,652 A | * | 11/1989 | Wordin | 251/309 X |
| 5,779,222 A | * | 7/1998 | Hollingworth et al. | 251/283 |

* cited by examiner

*Primary Examiner*—Henry C. Yuen
*Assistant Examiner*—Eric Keasel

(57) ABSTRACT

The preferred embodiment comprising a truncated cone valve plug, or a truncated cone with curved sides as in the tractrix valve is described. A step is fabricated into the large end of the valve plug. A secondary seal, called a Veri-Seal, is placed on the large end of the valve plug on the step at an intermediate location between the outer diameter of the plug and the stem. Pressure forces acting downward on the step on the top of the valve plug balance the pressure forces acting upward in the channel through the valve plug. By placing the Veri-Seal at this intermediate location on the top of the plug, the spring force can be minimized and the resulting torque to open and close the valve is consequently reduced.

3 Claims, 2 Drawing Sheets

PLUG VALVE INTERNAL PRESSURE BALANCING

BACKGROUND OF THE INVENTION

1. Field of the Invention

This invention relates to valves, specifically those valves known as plug valves. Plug valves have a rotating element called the plug, in the shape of a truncated cone with a hole through it. By rotating the plug a quarter turn, the valve can be opened or closed by aligning or mis-aligning the hole through the plug with the pipeline.

2. Background Information

The purpose of the plug valve is to contain fluid within the pipeline, exercise control over the starting and stopping of the fluid in the pipeline, hold the internal pressure within the plug valve, and prevent leaks to the surrounding environment. Prior art uses heavy spring forces to hold the plug against the body of the valve to ensure that the plug valve is leak tight. Plug valves are very hard to open and close because of the large spring forces employed to overcome unbalanced internal forces within the plug valve. Because the plug is tapered, there is slightly more area on top of the channel through the plug than on the bottom of the channel. See FIG. 1. As a result, the internal pressure produces an unbalanced force caused by the pressure acting on the larger area and this unbalanced force acts toward the larger end of the plug. It tends to try to push the plug away from the body of the valve, which, if allowed to happen, would allow leaking of the valve through the seat. To overcome this force unbalance, a somewhat higher spring force is needed. Since opening torque depends on the spring force, a larger spring force results in a higher torque required to open and close the valve. This level of torque makes it difficult to open and close the valve, especially by women or disabled workers. When an actuator is used to open and close the valve, usually a large, expensive actuator is needed. Clearly, a means is needed to lower the required torque on a plug valve while maintaining the valve leak tight.

BRIEF SUMMARY OF THE INVENTION

A step is fabricated on the large end of the plug. See FIG. 2. A special secondary seal is located at approximately half the radius of the large end of the plug on the step. This is called a Veri-Seal. Internal pressures act on the area of the step create a force that is nearly equal in magnitude to the unbalanced pressure force acting within the channel and acting in the opposite direction. By careful placement and sizing of a step and location of the Veri-Seal on the large end of the plug, all internal pressures are balanced. This eliminates the need to have extremely high spring forces to overcome the unbalanced internal pressures and subsequent high opening and closing torque.

DETAILED DESCRIPTION OF THE INVENTION

Figure 1:
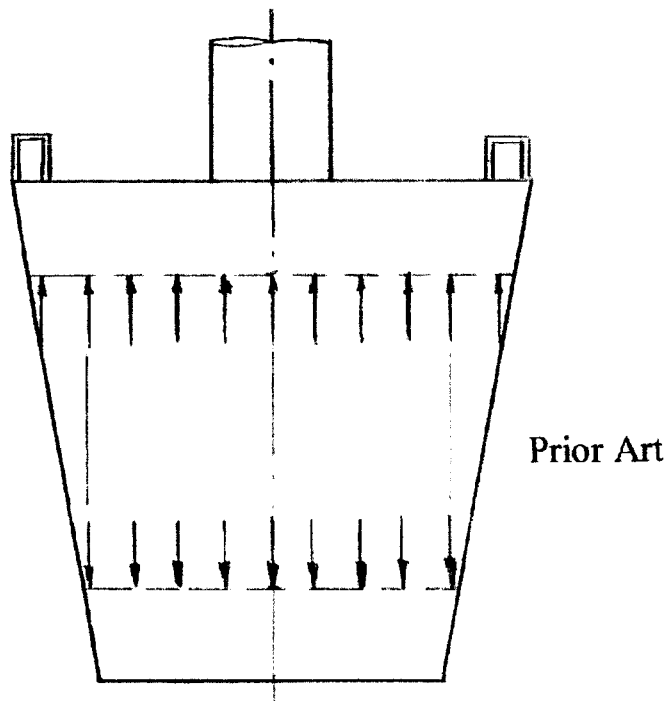
FIG. 1 shows a typical plug as prior art. Internal pressures in the channel are unbalanced. The Veri-Seal is located at the outer diameter of the large end of the plug.
Figure 2:
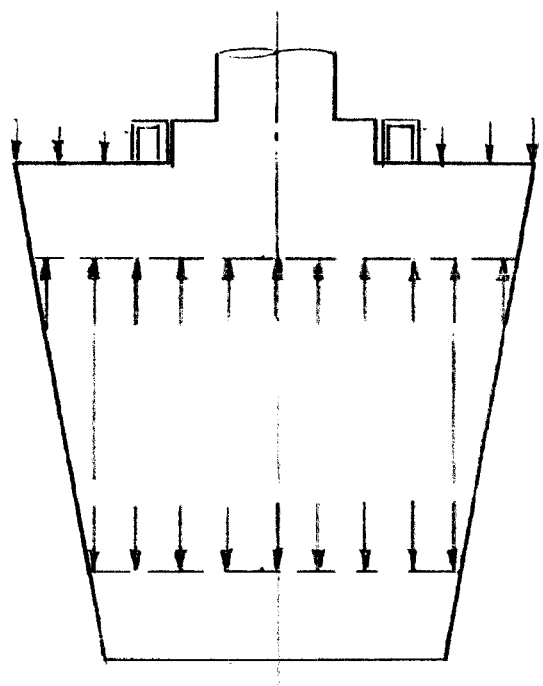
FIG. 2 shows the revised placement of the Veri-Seal as a means to allow internal pressures to act on the top of the plug. This action balances the internal pressures.
Figure 3:
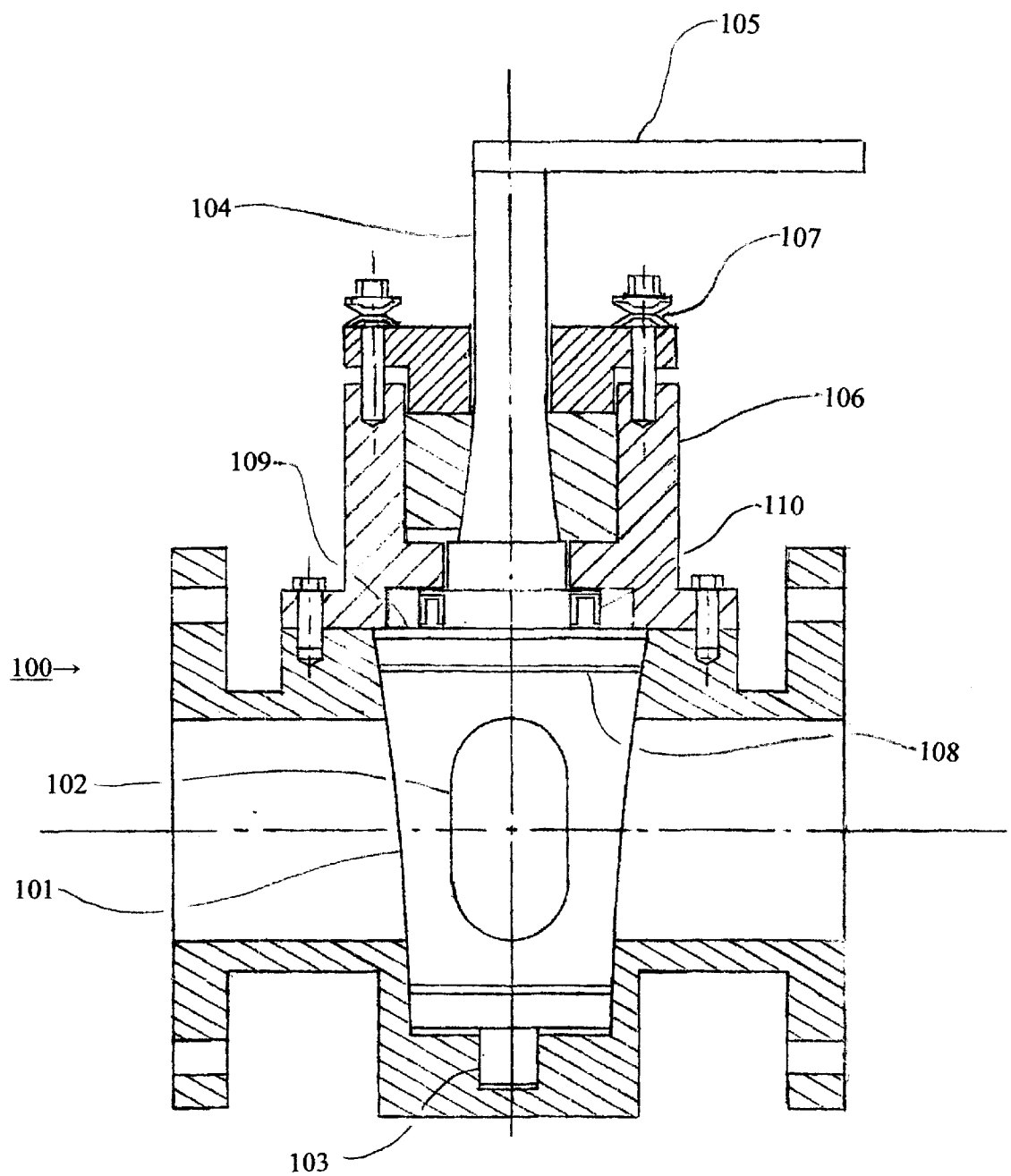
FIG. 3 shows the preferred embodiment of the invention.

The preferred embodiment is comprised of a valve plug, truncated cone, or a truncated cone with curved sides as in the tractrix valve. An example is shown in U.S. Pat. No. 4,878,652, "Plug Valve", as prior art. The valve plug has a channel through it for fluid communication or, with the valve plug turned 90 degrees, stops fluid flow and holds pressure against the upstream flow. The valve plug has a pivot below and valve stem above for the purpose of allowing the plug to turn through an angle of 90 degrees. A handle is attached to the stem for the purpose of applying torque to open and close the valve. The valve plug is inserted into and forced against the valve body by means of springs. The close contact between plug and body produces a primary seal to stop any flow through the plug valve, stop any leakage to the outside environment, and hold upstream pressure. The space between the plug and the body, though very narrow, is filled with lubricant, such as grease. Lubricant distribution channels are located in the body connected to an external grease supply. A step is fabricated into the large end of the valve plug. A secondary seal, called a Veri-Seal, is placed on the large end of the valve plug at an intermediate location between the outer diameter of the plug and the stem. So placed in this location, some pressure is communicated through the narrow, grease-filled space to the large end of the valve plug. This pressure force acting downward on the step on the top of the plug balances the pressure force acting upward in the channel through the valve plug. By placing the Veri-Seal at this intermediate location on the top of the plug, the spring force can be minimized and the resulting torque to open and close the valve is consequently reduced.

DESCRIPTION OF THE PREFERRED EMBODIMENT

A Plug Valve 100, comprising a valve plug 101, having a channel 102, through the valve plug 101, for fluid communication. With the valve plug 101, turned 90 degrees, the plug stops fluid flow and holds pressure against the upstream flow. The valve plug 101, has a pivot 103, below and valve stem 104, above to enable the valve plug to turn through an angle of 90 degrees. A handle 105, is attached to the valve stem 104, for the purpose of applying torque to open and close the plug valve 100. The valve plug 101, is inserted into and forced against the valve body 106, by means of springs 107. The close contact between valve plug 101, and valve body 106, produces a primary seal to stop any leakage to the outside environment through the plug valve 100, and to hold upstream pressure. The space between the valve plug 101, and the valve body 106, though very narrow, is filled with lubricant, such as grease. Lubricant distribution channels 108, are located in the valve body 106, connected to an external grease supply. A step 109, is fabricated into the large end of the valve plug 101. A secondary seal called a Veri-Seal 110, is placed on the large end of the valve plug 101, at an intermediate location between the outer diameter of the valve plug 101, and the valve stem 104. So placed in this location, some pressure is communicated through the narrow, grease-filled space to the large end of the valve plug 101. This pressure force acting downward on the large end of the valve plug 101, balances the pressure force acting upward in the channel 102, through the valve plug 101. By thus placing the Veri-Seal 110, at this intermediate location on the top of the plug, the force generated by the springs 107, can be minimized and the resulting torque to open and close the valve is consequently reduced.

We claim:

1. A plug valve consisting of a valve body and a valve plug, a means to force said valve plug against said valve body to produce a primary seal, said valve plug having a large end, said large end having an outer diameter, said valve plug having a small end, and said valve plug having a channel through said valve plug for fluid communication, a pivot attached to said small end of said valve plug, a valve stem attached to said large end of said valve plug, a step on said large end of said valve plug, a secondary seal on said step at an intermediate location between said outer diameter of said large end of said valve plug and said valve stem for the purpose of balancing internal forces acting on the valve plug and thereby reducing opening and closing torque of the plug valve.

2. The plug valve of claim 1 wherein said valve plug has the shape of a truncated cone.

3. The plug valve of claim 1 wherein said valve plug has a tractrix shape.

* * * * *